(12) United States Patent
Krupnik et al.

(10) Patent No.: US 8,004,528 B2
(45) Date of Patent: Aug. 23, 2011

(54) METHOD, SYSTEMS AND COMPUTER PRODUCT FOR DERIVING THREE-DIMENSIONAL INFORMATION PROGRESSIVELY FROM A STREAMING VIDEO SEQUENCE

(75) Inventors: Amnon Krupnik, Nofit (IL); Gilad Adiv, Haifa (IL); Nitzan Goldberg, Jerusalem (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 1135 days.

(21) Appl. No.: 11/747,924

(22) Filed: May 14, 2007

(65) Prior Publication Data

US 2007/0263000 A1 Nov. 15, 2007

(30) Foreign Application Priority Data

May 15, 2006 (IL) .......................................... 175632

(51) Int. Cl.
*G06T 13/00* (2006.01)
(52) U.S. Cl. ........................................ 345/473; 345/547
(58) Field of Classification Search .................. None
See application file for complete search history.

(56) References Cited

OTHER PUBLICATIONS

Douglas Fidaleo et al. "An Investigation of Modal Bias in 3D Face Tracking" Analysis and Modeling of Faces and Gestures Lecture Notes in Computer Science; LNCS, Springer-Verlag, BE, vol. 3723, 2005 pp. 125-139, XP019021345, ISBN :3-540-29229-2, abstract, sections "Introduction", "3 Rigid 3 D Tracking Overview", "5 Investigation of Tracking Model Bias".
Galpin, Franck and Morin, Luce :"Sliding Adjusting for 3D Video Representation" ERAIP Journal on Applied Signal Processing, (Online), vol. 10., 2002, pp. 1088-1101, XP002447561, Retrieved from the Internet: URL: hindawi, com/GetPDF. aspx?pii=S111086570 2206095 (retrieved on Aug. 20, 2007). abstract p. 1090, right-hand column, paragraph 3, sections "3 Background", "4.1.1 Dense motion estimation", 4.1.2 Sparse point matching, 6. Sliding Adjustment.
Thorsten Thormahlen et al: "Keyframe Selection for Camera Motion and Structure Estimation from Multiple Views" Computer Vision-ECCV 2004 Lecture Notes Springer~Verlag, BE, vol. 3021, 2004, pp. 523-535, XP019005802, ISBN: 3-54021984-6' abstract', 'section "1 Introduction", "2.2 Correspondence Analysis and Outlier Elimination", "2.5 Bundle Adjustment". 'Figure 2'.

*Primary Examiner* — Said Broome
(74) *Attorney, Agent, or Firm* — Mark M. Friedman

(57) ABSTRACT

A method for deriving three-dimensional information progressively from a streaming video sequence.

15 Claims, 3 Drawing Sheets

METHOD, SYSTEMS AND COMPUTER PRODUCT FOR DERIVING THREE-DIMENSIONAL INFORMATION PROGRESSIVELY FROM A STREAMING VIDEO SEQUENCE

FIELD AND BACKGROUND OF THE INVENTION

The present invention relates to reconstruction of structure from motion and, in particular, it concerns a method, system and computer product for deriving three-dimensional information progressively from a streaming video sequence.

Much work has been done in the field know as "Structure From Motion" (SfM) in which a three-dimensional form is reconstructed based upon a sequence of video images from a moving camera. Where no information is provided as to the path of the camera, the problem is sometimes referred to as "Structure And Motion" (SaM) since the motion of the camera must be derived together with the three-dimensional form. Reconstruction of three-dimensional form from a video sequence may be essentially subdivided into two processes: feature tracking and model reconstruction. Feature tracking identifies trackable features which appear in two or more frames of the video sequence. Then, model reconstruction employs the parallax between positions of these trackable features in multiple frames to derive three-dimensional information regarding the shape of the three-dimensional scene viewed and/or the camera motion.

Feature tracking is implemented as a two-dimensional image-processing task in which features (pixel patterns) suitable for tracking are identified in each image and then these features are compared between adjacent frames to identify tracks, sometimes referred to as "feature traces". Suitable features for tracking are features like corners which are variant under translation (pixel displacement), and which are not repeated many times in the frame. These properties are sometimes referred to as "cornerness" and "uniqueness". Searching for corresponding features in adjacent (or nearby) frames is typically performed by pattern comparison. Where sufficient processing resources are available, the pattern correlation may optionally be enhanced to allow matching of features which have undergone unknown planar transformations (e.g., scaling, rotation and/or "warping").

The average length of track per trackable feature is critical to the quality of the three-dimensional reconstruction. Besides features passing out of view or being obscured, tracks are often lost prematurely due to rotation, scaling, or changing of background, lighting or other factors which can distort the texture of the region around a feature and render it difficult to associate a feature reliably across widely spaced frames. A lack of reliable feature matches between widely spaced images deprives the model reconstruction process of the high-parallax information vital for precise reconstruction.

The model reconstruction is typically performed by a refinement process known as "bundle adjustment". Bundle adjustment, which is a process of refinement of an initial estimation, is computationally heavy, and its rate of convergence is highly dependent on what information or initial approximation is available as a starting point for the calculation.

The full bundle adjustment calculation is naturally suited to offline or "batch" processing scenarios where the entire video sequence is available before the calculations are performed. In such scenarios, the entire sequence is first processed to find feature tracks and an initial model approximation is derived. Bundle adjustment is then performed in parallel on some or all of the frames to refine the three-dimensional model and to derive the camera motion. Such offline techniques are well developed and documented, for example in Fitzgibbon and Zisserman (*Automatic Camera Tracking*, Andrew W. Fitzgibbon and Andrew Zisserman, Robotics Research Group, Department of Engineering Science, Oxford University, 2003), which is hereby incorporated by reference in its entirety.

The present invention, on the other hand, relates to "online" scenarios, where data is provided as a streaming video sequence, such as from real-time video, typically without any a priori information about the viewed scene or camera motion. Adaptation of the aforementioned techniques to online processing has proved non-trivial, particularly with regard to implementation of bundle adjustment in a real-time scenario. The common approach is to perform bundle adjustment locally on a small group (typically three) of closely spaced frames. These partial solutions are then concatenated or "stitched" together to provide an approximate solution for the entire video sequence (*Preemptive RANSAC for Live Structure and Motion Estimation*, David Nister, Proceedings of the Ninth IEEE International Conference on Computer Vision (ICCV 2003)). This approach suffers from accumulating errors over long sequences and from an inability to maintain registration through severe aspect changes. To address these problems, Vacchetti et al. (*Stable Real-Time 3D Tracking using Online and Offline Information*, L. Vacchetti, V. Lepetit and P. Fua, Computer Vision Lab, Swiss Federal Institute of Technology (EPFL)) propose an approach using a number of keyframes generated during an offline registration procedure. At each stage, the current image is processed together with the previous image and the closest-matching keyframe. Additional keyframes are generated during the online processing whenever the reliability of matching becomes too low. As a result, as newly generated keyframes get further from the original registration keyframes, drift errors will tend to accumulate. Furthermore, the need for a registration procedure with offline processing prior to starting the online processing renders the approach of Vacchetti et al. unsuited to many applications.

There is therefore a need for a method, system and computer product for deriving three-dimensional information progressively from a streaming video sequence, such as from real-time video, and without requiring any a priori information about the viewed scene or camera motion.

SUMMARY OF THE INVENTION

The present invention is a method, system and computer product for deriving three-dimensional information progressively from a streaming video sequence.

According to the teachings of the present invention there is provided, a method for deriving three-dimensional information progressively from a streaming video sequence, the method comprising: (a) for each successive frame, identifying a plurality of trackable features having corresponding features in a previous frame of the sequence; (b) intermittently designating a current frame as a keyframe; and (c) performing a bundle adjustment calculation on a group of all prior keyframes designated during a period prior to the current frame together with the currently designated keyframe, the bundle adjustment calculation employing an initial approximation derived at least in part from a result of a bundle adjustment calculation performed previously on the prior keyframes.

According to a further feature of the present invention, the period prior to the current frame is a rolling period containing at least about 10 previously designated keyframes.

According to a further feature of the present invention, the keyframes are designated at variable spacing of frames through the video sequence so as to ensure at least a given minimum number of trackable features between adjacent keyframes.

According to a further feature of the present invention, the keyframes are spaced at intervals of at least about 10 frames.

According to a further feature of the present invention, the initial approximation includes a prediction of a camera pose for the current keyframe, the prediction being derived at least in part from an extrapolation of a camera motion derived in the bundle adjustment calculation performed on the prior keyframes.

According to a further feature of the present invention, the initial approximation includes a prediction of a camera pose for the current keyframe, the prediction being derived at least in part from correlation of trackable features in successive frames against a three-dimensional model derived in the bundle adjustment calculation performed on the prior keyframes.

According to a further feature of the present invention, the bundle adjustment calculation generates a three-dimensional model of an object scene, the method further comprising, for each frame, correlating trackable features in the frame with the three-dimensional model to derive an estimated camera position for the frame.

According to a further feature of the present invention, the identifying a plurality of trackable features includes: (a) predicting a position or appearance within the frame of a potentially trackable feature based at least in part upon a three-dimensional model and a predicted camera motion derived from the bundle adjustment calculation; and (b) searching within the frame for a trackable feature corresponding to the potentially trackable feature, the searching employing the predicted position or appearance of the potentially trackable feature.

According to a further feature of the present invention, the bundle adjustment calculation generates a three-dimensional model of an object scene, the method further comprising: (a) defining within the three-dimensional model at least one point of interest; (b) correlating a supplementary video frame with the three-dimensional model to derive parameters of the supplementary video frame; and (c) identifying within the supplementary video frame the at least one point of interest.

According to a further feature of the present invention, the defining includes designating a location within a frame of the video sequence.

According to a further feature of the present invention, the defining includes: (a) retrieving reference data corresponding to at least part of a three-dimensional reference model associated with a reference coordinate system; (b) registering the three-dimensional model with the reference data so as to derive a mapping between the reference coordinate system and coordinates of the three-dimensional model; (c) inputting a point of interest defined in the reference coordinate system; and (d) employing the mapping to identify a location of the point of interest within the three-dimensional model.

There is also provided according to the teachings of the present invention, a method for deriving three-dimensional information progressively from a streaming video sequence, the method comprising: (a) for each successive frame, identifying a plurality of trackable features having corresponding features in a previous frame of the sequence; (b) performing a bundle adjustment calculation on a group of prior frames together with a currently designated frame, (c) wherein the identifying a plurality of trackable features includes: (i) predicting a position or appearance within the frame of a potentially trackable feature from a previous frame, the position or appearance being predicted based at least in part upon a three-dimensional model and a predicted camera motion derived from the bundle adjustment calculation; and (ii) searching within the frame for a trackable feature corresponding to the potentially trackable feature, the searching employing the predicted position or appearance of the potentially trackable feature.

There is also provided according to the teachings of the present invention, a method for tracking a point of interest employing a three dimensional model derived from a video sequence, the method comprising: (a) processing a sequence of video frames to derive a three-dimensional model of at least part of a viewed scene; (b) defining within the three-dimensional model at least one point of interest; (c) correlating a supplementary video frame with the three-dimensional model to derive parameters of the supplementary video frame; and (d) identifying within the supplementary video frame the at least one point of interest.

According to a further feature of the present invention, the defining includes designating a location within a frame of the sequence of video frames.

According to a further feature of the present invention, the defining includes: (a) retrieving reference data corresponding to at least part of a three-dimensional reference model associated with a reference coordinate system; (b) registering the three-dimensional model with the reference data so as to derive a mapping between the reference coordinate system and coordinates of the three-dimensional model; (c) inputting a point of interest defined in the reference coordinate system; and (d) employing the mapping to identify a location of the point of interest within the three-dimensional model.

There is also provided according to the teachings of the present invention, a program storage device readable by a machine, tangibly embodying a program of instructions executable by the machine to perform a method for deriving three-dimensional information progressively from a streaming video sequence, the method comprising: (a) for each successive frame, identifying a plurality of trackable features having corresponding features in a previous frame of the sequence; (b) intermittently designating a current frame as a keyframe; and (c) performing a bundle adjustment calculation on a group of all prior keyframes designated during a period prior to the current frame together with the currently designated keyframe, the bundle adjustment calculation employing an initial approximation derived at least in part from a result of a bundle adjustment calculation performed previously on the prior keyframes.

There is also provided according to the teachings of the present invention, a program storage device readable by a machine, tangibly embodying a program of instructions executable by the machine to perform a method for deriving three-dimensional information progressively from a streaming video sequence, the method comprising: (a) for each successive frame, identifying a plurality of trackable features having corresponding features in a previous frame of the sequence; (b) performing a bundle adjustment calculation on a group of prior frames together with a currently designated frame, (c) wherein the identifying a plurality of trackable features includes: (i) predicting a position or appearance within the frame of a potentially trackable feature from a previous frame, the position or appearance being predicted based at least in part upon a three-dimensional model and a predicted camera motion derived from the bundle adjustment calculation, and (ii) searching within the frame for a trackable feature corresponding to the potentially trackable feature, the searching employing the predicted position or appearance of the potentially trackable feature.

There is also provided according to the teachings of the present invention, a program storage device readable by a machine, tangibly embodying a program of instructions executable by the machine to perform a method for tracking a point of interest employing a three dimensional model derived from a video sequence, the method comprising: (a) processing a sequence of video frames to derive a three-dimensional model of at least part of a viewed scene; (b) defining within the three-dimensional model at least one point of interest (c) correlating a supplementary video frame with the three-dimensional model to derive parameters of the supplementary video frame; and (d) identifying within the supplementary video frame the at least one point of interest.

There is also provided according to the teachings of the present invention, a system for deriving three-dimensional information progressively from a streaming video sequence, the system comprising: (a) a feature tracking module configured to: (i) identify, for each successive frame, a plurality of trackable features having corresponding features in a previous frame of the sequence, and (ii) intermittently designate a current frame as a keyframe; and (b) a model derivation module configured to perform a bundle adjustment calculation on a group of all prior keyframes designated during a period prior to the current frame together with the currently designated keyframe, the bundle adjustment calculation employing an initial approximation derived at least in part from a result of a bundle adjustment calculation performed previously on the prior keyframes.

There is also provided according to the teachings of the present invention, a system for deriving three-dimensional information progressively from a streaming video sequence, the system comprising: (a) a feature tracking module configured to identify, for each successive frame, a plurality of trackable features having corresponding features in a previous frame of the sequence; (b) a model derivation module configured to perform a bundle adjustment calculation on a group of prior frames together with a currently designated frame, wherein the feature tracking module is configured to identify a plurality of trackable features by: (i) predicting a position or appearance within the frame of a potentially trackable feature from a previous frame, the position or appearance being predicted based at least in part upon a three-dimensional model and a predicted camera motion derived from the bundle adjustment calculation performed by the model derivation module; and (ii) searching within the frame for a trackable feature corresponding to the potentially trackable feature, the searching employing the predicted position or appearance of the potentially trackable feature.

There is also provided according to the teachings of the present invention, a system for tracking a point of interest employing a three dimensional model derived from a video sequence, the system comprising: (a) a processing system configured to process a sequence of video frames to derive a three-dimensional model of at least part of a viewed scene; and (b) a point-of-interest tracker module configured to: (i) define within the three-dimensional model at least one point of interest, (ii) correlate a supplementary video frame with the three-dimensional model to derive parameters of the supplementary video frame, and (iii) identify within the supplementary video frame the at least one point of interest.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a method, system and computer product for deriving three-dimensional information progressively from a streaming video sequence.

The principles and operation of methods and systems according to the present invention may be better understood with reference to the drawings and the accompanying description.

Figure 1:
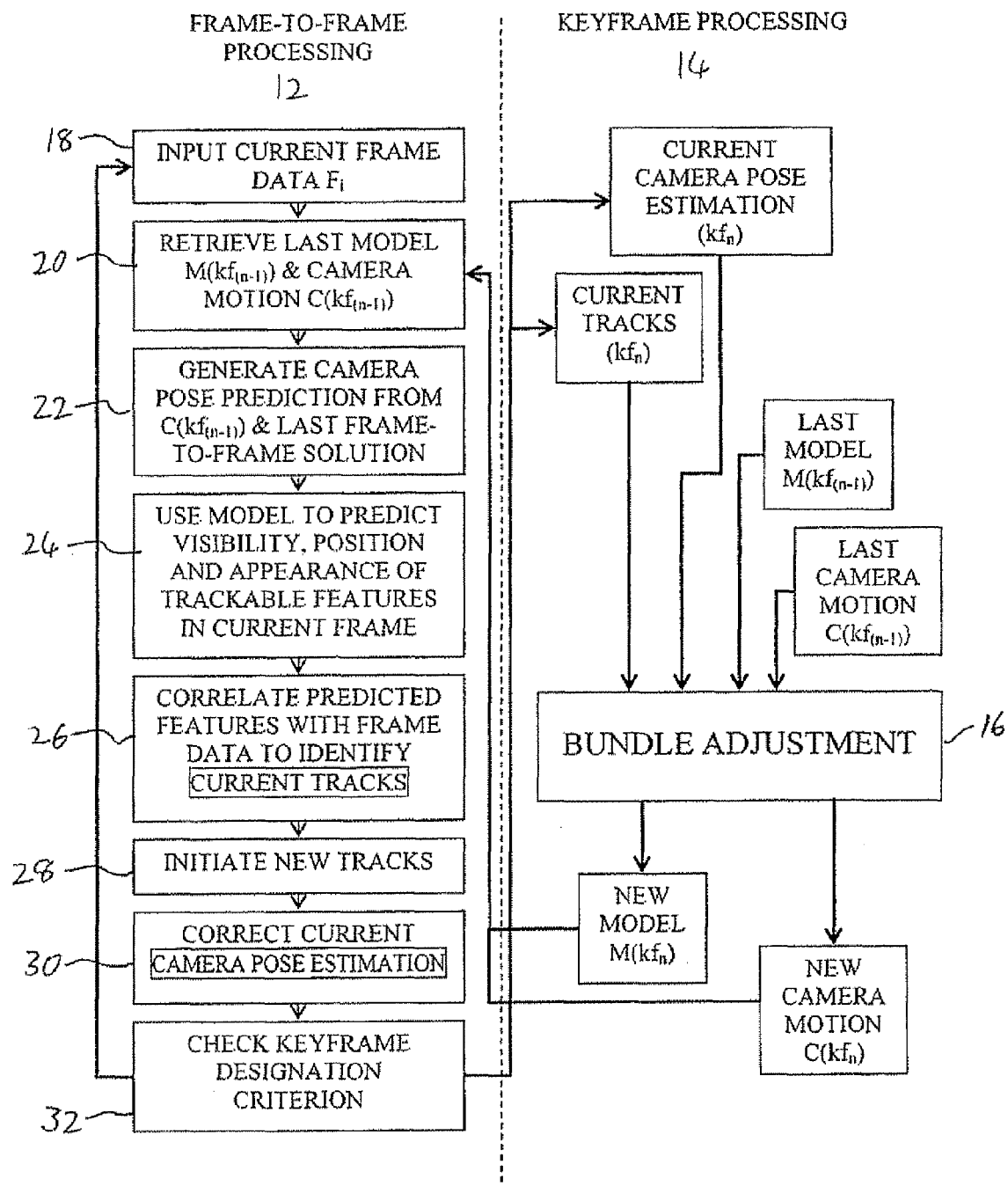
FIG. 1 is a flow diagram illustrating a method according to the teachings of the present invention for deriving three-dimensional information progressively from a streaming video sequence.

Referring now to the drawings, FIG. 1 illustrates a method, generally designated 10, constructed and operative according to the teachings of the present invention, for deriving three-dimensional information progressively from a streaming video sequence.

By way of introduction, the present invention provides an improved methodology for implementing both model reconstruction and feature tracking in the context of real-time processing. With regard to model reconstruction, reliable anchoring of the model against accumulated errors is achieved by performing bundle adjustment on a relatively large number of keyframes spread throughout an extended portion of a video sequence.

It is a particular feature of a first aspect of the present invention that this bundle adjustment is performed repeatedly as new data accumulates, each time employing an initial approximation derived from a result of a previous bundle adjustment calculation performed on the previously available data. This ensures that the initial estimate entered into the calculation is a good approximation to the required solution, thereby helping to ensure sufficiently rapid convergence of the calculation for real-time implementations.

With regard to feature tracking, it is a particular feature of a second aspect of the present invention that the feature tracking process also takes advantage of the fact that a three-dimensional model has already been derived in the real-time processing. Specifically, the three-dimensional model derived from a previous bundle adjustment calculation is preferably used to generate a prediction of expected feature positions and their expected appearance for a new frame of the streaming video. The prediction may also indicate where a feature is expected to be lost from the field of view, obscured, or when a previously lost feature is expected to reappear. The availability of predicted feature positions and/or knowledge of the three-dimensional shape of the features typically allow reliable association of features across a significantly wider range of frames, and under wider variations of viewing angle and lighting conditions, than would be possible through pixel pattern correlation alone. This in turn provides a base of information for more reliable and precise model reconstruction. These and other advantages of the present invention will be further understood with reference to the following detailed description.

Before turning to the features of the invention in detail, it will be useful to define various terminology as used herein in the description and claims. Firstly, reference is made to "progressive" processing of a "streaming video sequence". The term "streaming video sequence" is used to refer to a sequence of images or "frames" which are made available sequentially, such as are generated from a video camera or received via a communications link from a remote source. The video may be in any format, at any frame rate, and the images may be color or monochrome, and of any resolution. The video sequence may be derived from any image sensor (referred to generically as "cameras"), including but not limited to visible-light cameras and infrared cameras.

The term "progressive" is used to describe processing which occurs as the data becomes available, in contrast to the "batch" processing of entire sequences mentioned above.

The processing is also referred to as "real-time" in the sense that it provides output during the ongoing input and/or display of the video sequence. It should be noted that the output need not be "real-time" with respect to generation of the image sequence from a camera, and may be applied equally to a streaming video sequence as it becomes available after being sampled at a previous time. Processing is considered "real-time" in this context so long as it progresses at an average rate sufficient to keep up with the frame-rate of the video sequence so that it can continue to operate during a video sequence of essentially unlimited duration. The "real-time" result is preferably available with a lag of no more than a few seconds after input of the corresponding data.

In a further matter of terminology, mention is made of "three-dimensional information" derived by the present invention. The term "three-dimensional information" as used herein refers to any and all information which is derived directly or indirectly from a three-dimensional reconstruction obtained by processing a video sequence according to the teachings of the present invention. Thus defined, non-limiting examples of three-dimensional information include a shape of a three-dimensional model of the object scene, a path of motion or instantaneous position of the camera for a given frame or frames, and a position in a two dimensional view of a point designated in three dimensional space.

Turning now to the method of the present invention in more detail, FIG. 1 illustrates a particularly preferred implementation of a method, generally designated 10, according to the teachings of the present invention, for deriving three-dimensional information progressively from a streaming video sequence. In general terms, method 10 includes a frame-to-frame processing sequence 12 which, for each successive frame, identifies a plurality of trackable features having corresponding features in a previous frame of the sequence and intermittently designates a current frame as a keyframe. Method 10 also includes a keyframe processing sequence 14 which performs a bundle adjustment calculation 16 on a group of all prior keyframes designated during a period prior to the current frame together with the currently designated keyframe. The bundle adjustment calculation 16 employs an initial approximation derived at least in part from a result of a bundle adjustment calculation performed previously on the prior keyframes.

The frame-to-frame processing sequence 12 is shown here as a cycle beginning with input of image data for an arbitrary "current frame" at step 18. As mentioned above, it is a particularly preferred feature of certain implementations of the present invention that identification of feature traces between successive frames of the video sequence is enhanced by use of results of a previous bundle adjustment calculation. Thus, at step 20, a data set of a three-dimensional model and the corresponding camera motion derived from a previous (typically most recent) bundle adjustment calculation are retrieved. At step 22, this data is used, together with a solution from the previous frame-to-frame calculation, to generate a prediction for the camera pose for the current frame. This prediction is then preferably used at step 24 to predict which previously tracked features are expected to be visible within the current frame, where in the frame they are expected to appear, and how the tracked features are likely to appear from the estimated viewing direction, for example, estimating geometrical warping due to perspective changes. Performance of some, or all, of these predictive calculations significantly increases the likelihood of achieving a match at step 26 where the current frame is correlated with other frames by searching for the predicted appearance and location of the trackable features to identify a set of current tracks identifiable within the current frame. The increased likelihood of feature matching in turn leads to an increased mean track length and improving the reliability of the three-dimensional model refinement.

In addition to matching of existing tracks, at step 28, the frame processing preferably also identifies candidate features for initiating new tracks, particularly where a field of view has shifted to bring new regions or objects into view. The tracks identified at step 26 are preferably used at step 30 to correct the estimated camera pose of step 22 to generate a more precise estimation of the current camera pose. In addition to providing a good estimate of camera pose for the next bundle adjustment calculation as detailed below, this estimate of current camera pose is preferably also used to improve feature tracking between frames, and provides continuity where point-of-interest tracking is used as will be described with reference to FIG. 2.

Finally with regard to the frame-by-frame processing, at step 32, a keyframe designation criterion is applied to determine whether a new keyframe should be designated. In order to ensure sufficient data overlap between adjacent keyframes for reliable three-dimensional reconstruction without unduly increasing the computational burden, keyframes are preferably designated at variable spacing of frames through the video sequence so as to ensure at least a given minimum number of trackable features between adjacent keyframes. Thus, a simple implementation of the keyframe designation criterion of step 32 may test whether the number of current tracks which originated prior to the previous keyframe is below a certain threshold value and, if yes, trigger designation of a new keyframe. Optionally, additional criteria such as a maximum frame spacing between successive keyframes may be applied. Frame-to-frame processing then returns to step 18 where a new current frame is input and the processing repeated as above.

Keyframe processing 14 is initiated whenever step 32 initiates designation of a new keyframe and occurs in parallel with the frame-to-frame processing of new frames described above. As mentioned above, convergence of the bundle adjustment calculation 16 is highly dependent upon the quality of the initial estimate input into the calculation. Since the calculation is performed repeatedly after designation of each new keyframe, each calculation has as an input the previous solution as defined by the last three-dimensional model based on keyframes up to the "n−1" keyframe, designated here as $M(kf_{(n-1)})$, and the last estimate of camera motion based on keyframes up to the "n−1" keyframe, designated here as $C(kf_{(n-1)})$. In addition, the frame-to-frame processing generates for each frame, and hence also for each new keyframe, a good estimate of the current camera pose from step 30 and a set of current tracks from step 26. This information altogether provides a good basis for each successive bundle adjustment calculation, thereby facilitating completion of the calculation at rates required for "real-time" operation, to generate a new three-dimensional model based on keyframes up to keyframe "n", $M(kf_n)$, and a new estimate of camera motion based on keyframes up to keyframe "n", $C(kf_n)$. As soon as these new results become available, they are preferably transferred as an update for use in step 20 and onwards in the frame-to-frame processing sequence.

It should be noted that the bundle adjustment calculation of the present invention preferably spans an extended part of the input video sequence, thereby providing reliable and unique correlation between objects viewed in widely spaced frames. For example, the keyframes are preferably spaced by intervals of at least 10 frames, and the bundle adjustment calculation is preferably performed on a group of at least the last 10 keyframes. The calculation thereby provides a self-consistent solution spanning at least 100 consecutive frames. In many cases, the calculation may span one or more order of magnitude greater numbers of consecutive frames.

Figure 2:
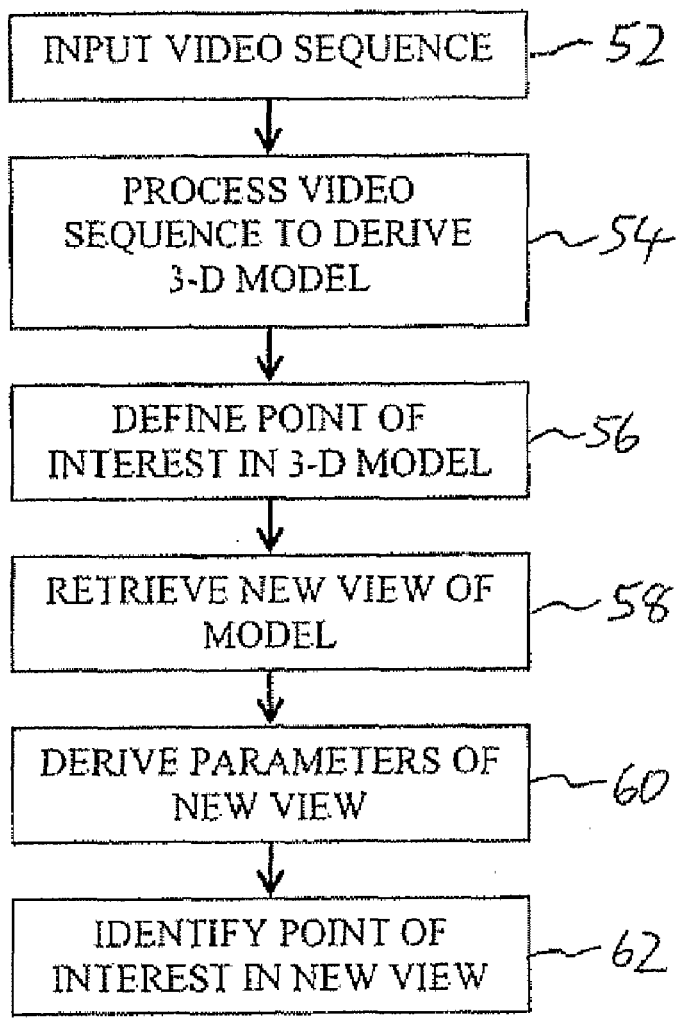
FIG. 2 is a flow diagram of a model-based tracking method according a the teachings of the present invention.

Turning now to FIG. 2, there is shown a schematic representation of a further aspect of the present invention relating to tracking of a point of interest in a video sequence. Although the point-of-interest tracking aspect of the present invention will be described here in a particularly preferred implementation based upon the processing techniques of FIG. 1, it should be noted that the tracking aspect of the invention in its broader sense is not limited to those processing techniques and may be used to advantage with alternative processing techniques.

Referring not to FIG. 2, there is shown a method 50 for tracking a point of interest employing a three dimensional model derived from a video sequence. The method starts at step 52 by inputting a video sequence and then processing the video sequence at step 54 so as to derive a three-dimensional model of at least part of a viewed scene. The input and processing may be performed as progressive (e.g., real-time) processing of part of a video sequence as described above, or may be batch processing of a self-contained video sequence. Then at step 56 a point of interest is defined in the context of the three-dimensional model derived in step 54. The point of interest is then tracked as follows.

For each new view of the model received (step 58), the new view is correlated with the three-dimensional model to derive parameters of the supplementary video frame (step 60). The point of interest can then be identified within the new view (step 62) for display or further processing. It will be noted that the "new view" may be a supplementary frame from a continuation of the video sequence which was input at step 52. Alternatively, the "new view" may be a separate still image, or a frame from a video sequence separate from the initial sequence. Furthermore, the new view may be from a different camera, or taken at different wavelengths than the initial video sequence.

Designation of a point of interest within the three-dimensional model for tracking may be achieved in various different ways, depending upon the specific application. For example, in one preferred implementation, a point of interest for tracking is defined by designating a location in two-dimensions within a frame of the sequence of video frames, for example, by a click-to-select user input. This point is then translated into a position in three dimensions.

According to a further option, a point of interest can be downloaded from an external database, such as a geographic database, by first correlating the three-dimensional model to the database to derive a mapping between the model and the database. In this case, reference data corresponding to at least part of a three-dimensional reference model associated with a reference coordinate system is first retrieved, and the three-dimensional model is registered with the reference data so as to derive a mapping between the reference coordinate system and coordinates of the three-dimensional model. The point of interest as defined in the reference coordinate system is then input and converted, using the mapping, to identify a location of the point of interest within the three-dimensional model.

Figure 3:
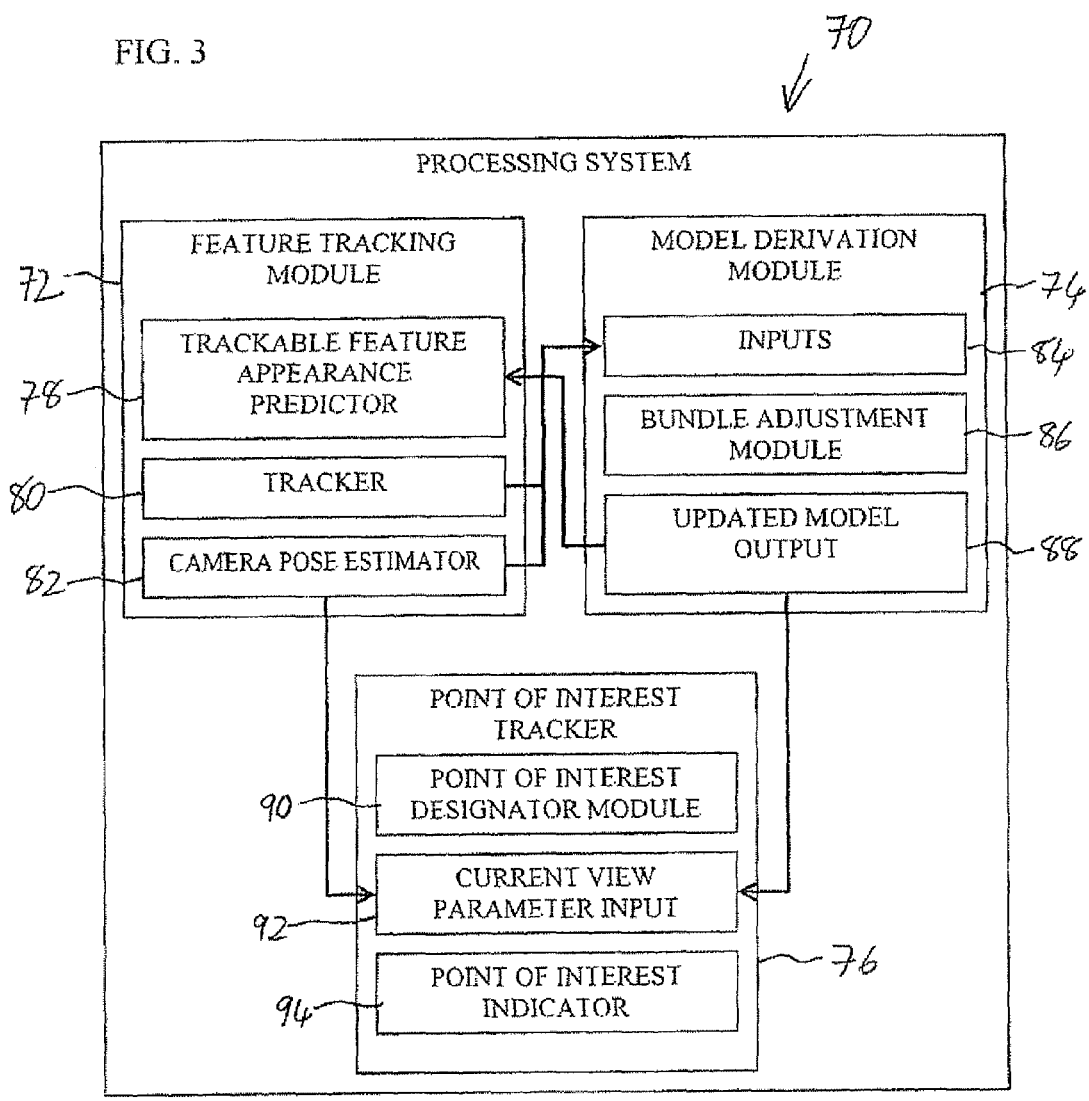
FIG. 3 is a schematic representation of a system, constructed and operative according to the teachings of the present invention, for implementing the methods of FIGS. 1 and 2.
Figure 4:
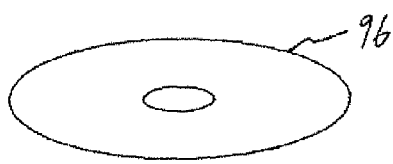
FIG. 4 is a schematic representation of an executable computer product for configuring a computer for implementing the methods of FIGS. 1 and 2.

Turning now to FIG. 3, there is shown a schematic illustration of a system, generally designated 70, constructed and operative according to the teachings of the present invention for implementing the methods of FIGS. 1 and 2. For simplicity of representation, only a processing system is shown in detail. As will be clear to one skilled in the art, the processing system is supplemented by standard components as necessary, including some or all of: a camera or an communications link for inputting video sequences to be processed, data storage and memory devices, a display and user input devices.

As illustrated here, processing system 70 includes a feature tracking module 72 for implementing frame-to-frame processing 12, a model derivation module 74 for implementing keyframe processing 14, and a point-of-interest tracker 76 for implementing tracking method 50. Each module may be implemented using dedicated hardware, general purpose hardware configured by suitable software, or any combination of hardware and software, as is well known in the art. Furthermore, the various modules may be implemented using a single processor, or the various functions and sub-functions may be divided between multiple processors without necessarily keeping to the structural subdivisions as illustrated here.

In keeping with the main features of processing 12, feature tracking module 72 preferably includes a trackable feature appearance predictor 78, a feature tracker 80 and a camera pose estimator 82. Feature tracker 80 and camera pose estimator 82 preferably provide outputs to an input sub-module 84 of model derivation module 74 for use in a bundle adjustment sub-module 86 to generate an updated model output 88. This output, in turn, is preferably transferred to trackable feature appearance predictor 78 for use in predicting the appearance of trackable features in successive frames, all as described in more detail above.

With regard to tracking points of interest, the functions of steps 52, 54, 58 and 60 are typically performed inherently by modules 72 and 74. Accordingly, point of interest tracker 76 preferably includes a point of interest designator module 90 for performing step 56, a current view parameter input 92 which receives details of the current frame camera pose from camera pose estimator 82 and/or model output 88, and a point of interest indicator 94 for displaying or outputting the location of the point of interest in the current frame. The implementation of all of the aforementioned modules and sub-modules will be clear to one ordinarily skilled in the art on the basis of the description of the corresponding functions above.

Finally, in the case that the system of the present invention is implemented using general purpose hardward configured by suitable software, the present invention preferably also provides a program storage device, represented schematically here as an optically readable disk 96, readable by a machine, tangibly embodying a program of instructions executable by the machine to perform the method of FIG. 1 and/or the method of FIG. 2.

It will be appreciated that the above descriptions are intended only to serve as examples, and that many other embodiments are possible within the scope of the present invention as defined in the appended claims.

What is claimed is:

1. A method employing a processing system to derive three-dimensional information progressively from a streaming video sequence without requiring prior information, the method comprising:
   (a) for each successive frame, identifying a plurality of trackable features having corresponding features in a previous frame of the sequence;
   (b) intermittently designating a current frame as a keyframe; and
   (c) performing by use of the processing system a bundle adjustment calculation on a group of keyframes including the currently designated keyframe, said bundle adjustment calculation employing an initial approximation derived at least in part from a result of a previously performed bundle adjustment calculation,
wherein said bundle adjustment is performed repeatedly for each newly designated keyframe together with said group of keyframes employed for a previous bundle adjustment calculation as data accumulates from the streaming video sequence, at least until said group of keyframes includes at least 10 previously designated keyframes.

2. The method of claim 1, wherein said keyframes are designated at variable spacing of frames through the video sequence so as to ensure at least a given minimum number of trackable features between adjacent keyframes.

3. The method of claim 1, wherein said keyframes are spaced at intervals of at least about 10 frames.

4. The method of claim 1, wherein said initial approximation includes a prediction of a camera pose for said current keyframe, said prediction being derived at least in part from an extrapolation of a camera motion derived in said bundle adjustment calculation performed on said prior keyframes.

5. The method of claim 1, wherein said initial approximation includes a prediction of a camera pose for said current keyframe, said prediction being derived at least in part from correlation of trackable features in successive frames against a three-dimensional model derived in said bundle adjustment calculation performed on said prior keyframes.

6. The method of claim 1, wherein said bundle adjustment calculation generates a three-dimensional model of an object scene, the method further comprising, for each frame, correlating trackable features in the frame with said three-dimensional model to derive an estimated camera position for the frame.

7. The method of claim 1, wherein said identifying a plurality of trackable features includes:
   (a) predicting a position or appearance within said frame of a potentially trackable feature based at least in part upon a three-dimensional model and a predicted camera motion derived from said bundle adjustment calculation; and
   (b) searching within said frame for a trackable feature corresponding to said potentially trackable feature, said searching employing said predicted position or appearance of said potentially trackable feature.

8. The method of claim 1, wherein said bundle adjustment calculation generates a three-dimensional model of an object scene, the method further comprising:
   (a) defining within said three-dimensional model at least one point of interest;
   (b) correlating a supplementary video frame with said three-dimensional model to derive parameters of said supplementary video frame; and
   (c) identifying within said supplementary video frame said at least one point of interest.

9. The method of claim 7, wherein said defining includes designating a location within a frame of said video sequence.

10. The method of claim 7, wherein said defining includes:
    (a) retrieving reference data corresponding to at least part of a three-dimensional reference model associated with a reference coordinate system;
    (b) registering said three-dimensional model with said reference data so as to derive a mapping between said reference coordinate system and coordinates of said three-dimensional model;
    (c) inputting a point of interest defined in said reference coordinate system; and
    (d) employing said mapping to identify a location of said point of interest within said three-dimensional model.

11. A method employing a processing system to derive three-dimensional information progressively from a streaming video sequence, the method comprising:
    (a) for each successive frame, identifying a plurality of trackable features having corresponding features in a previous frame of the sequence;
    (b) performing by use of the processing system a bundle adjustment calculation on a group of prior frames together with a currently designated frame,
wherein said identifying a plurality of trackable features includes:
    (i) predicting a position or appearance within said frame of a potentially trackable feature from a previous frame, said position or appearance being predicted based at least in part upon a three-dimensional model and a predicted camera motion derived from said bundle adjustment calculation; and
    (ii) searching within said frame for a trackable feature corresponding to said potentially trackable feature, said searching employing said predicted position or appearance of said potentially trackable feature.

12. A non-transitory program storage device readable by a machine, tangibly embodying a program of instructions executable by the machine to perform a method for deriving three-dimensional information progressively from a streaming video sequence without requiring prior information, the method comprising:
    (a) for each successive frame, identifying a plurality of trackable features having corresponding features in a previous frame of the sequence;
    (b) intermittently designating a current frame as a keyframe; and
    (c) performing a bundle adjustment calculation on a group of keyframes including the currently designated keyframe, said bundle adjustment calculation employing an initial approximation derived at least in part from a result of a previously performed bundle adjustment calculation,
wherein said bundle adjustment is performed repeatedly for each newly designated keyframe together with said group of keyframes employed for a previous bundle adjustment calculation as data accumulates from the streaming video sequence, at least until said group of keyframes includes at least 10 previously designated keyframes.

13. A non-transitory program storage device readable by a machine, tangibly embodying a program of instructions executable by the machine to perform a method for deriving three-dimensional information progressively from a streaming video sequence, the method comprising:
    (a) for each successive frame, identifying a plurality of trackable features having corresponding features in a previous frame of the sequence;

(b) performing a bundle adjustment calculation on a group of prior frames together with a currently designated frame, wherein said identifying a plurality of trackable features includes:
  (i) predicting a position or appearance within said frame of a potentially trackable feature from a previous frame, said position or appearance being predicted based at least in part upon a three-dimensional model and a predicted camera motion derived from said bundle adjustment calculation; and
  (ii) searching within said frame for a trackable feature corresponding to said potentially trackable feature, said searching employing said predicted position or appearance of said potentially trackable feature.

14. A system for deriving three-dimensional information progressively from a streaming video sequence, the system comprising a processing system including at least one processor, said processing system being configured to provide:
  (a) a feature tracking module configured to:
    (i) identify, for each successive frame, a plurality of trackable features having corresponding features in a previous frame of the sequence, and
    (ii) intermittently designate a current frame as a keyframe; and
  (b) a model derivation module configured to perform a bundle adjustment calculation on a group of keyframes including the currently designated keyframe, said bundle adjustment calculation employing an initial approximation derived at least in part from a result of a previously performed bundle adjustment calculation, wherein said bundle adjustment is performed repeatedly for each newly designated keyframe together with said group of keyframes employed for a previous bundle adjustment calculation as data accumulates from the streaming video sequence, at least until said group of keyframes includes at least 10 previously designated keyframes.

15. A system for deriving three-dimensional information progressively from a streaming video sequence, the system comprising a processing system including at least one processor, said processing system being configured to provide:
  (a) a feature tracking module configured to identify, for each successive frame, a plurality of trackable features having corresponding features in a previous frame of the sequence;
  (b) a model derivation module configured to perform a bundle adjustment calculation on a group of prior frames together with a currently designated frame,
wherein said feature tracking module is configured to identify a plurality of trackable features by:
  (i) predicting a position or appearance within said frame of a potentially trackable feature from a previous frame, said position or appearance being predicted based at least in part upon a three-dimensional model and a predicted camera motion derived from said bundle adjustment calculation performed by said model derivation module; and
  (ii) searching within said frame for a trackable feature corresponding to said potentially trackable feature, said searching employing said predicted position or appearance of said potentially trackable feature.

* * * * *